United States Patent [19]

Stall et al.

[11] Patent Number: 5,776,398
[45] Date of Patent: Jul. 7, 1998

[54] METHOD OF REGENERATING SAUSAGE CASING

[75] Inventors: Alan David Stall, Naperville, Ill.; Antonio Vitorero Miguelez, Madrid, Spain

[73] Assignee: Alfacel s.a., Madrid, Spain

[21] Appl. No.: 784,695

[22] Filed: Jan. 15, 1997

[51] Int. Cl.⁶ .................. B29C 47/00; B29C 71/00; B29D 23/00
[52] U.S. Cl. .................. 264/188; 264/196; 264/209.1
[58] Field of Search .................. 264/188, 196, 264/209.1

[56] References Cited

U.S. PATENT DOCUMENTS

| | | | |
|---|---|---|---|
| 604,206 | 5/1898 | Cross et al. | 536/56 |
| 836,452 | 11/1906 | Muller | 264/188 |
| 1,036,282 | 8/1912 | Lilienfeld | 427/339 |
| 1,070,776 | 8/1913 | Cohoe et al. | 426/92 |
| 1,158,400 | 10/1915 | Cohoe | 106/136.1 |
| 1,163,740 | 12/1915 | Cohoe | 264/561 |
| 1,601,686 | 9/1926 | Henderson | 426/140 |
| 1,612,508 | 12/1926 | Henderson et al. | 264/562 |
| 1,645,050 | 10/1927 | Henderson | 426/138 |
| 1,654,253 | 12/1927 | Henderson | 264/188 X |
| 1,887,446 | 11/1932 | Voss | 134/16 |
| 1,937,225 | 11/1933 | Hewitt | 264/196 |
| 2,013,491 | 9/1935 | Freund | 264/195 |
| 2,043,172 | 6/1936 | Hewitt | 264/198 |
| 2,043,455 | 6/1936 | Voss et al. | 264/196 |
| 2,271,932 | 2/1942 | Atkinson | 264/197 |
| 2,999,756 | 9/1961 | Shiner et al. | 428/34.8 |
| 2,999,757 | 9/1961 | Shiner et al. | 428/34.8 |
| 3,835,113 | 9/1974 | Burke et al. | 264/196 X |
| 4,590,107 | 5/1986 | Bridgeford | 428/34.8 |
| 4,778,639 | 10/1988 | Jon et al. | 264/190 |
| 5,358,765 | 10/1994 | Markulin | 428/34.8 |

FOREIGN PATENT DOCUMENTS

| | | |
|---|---|---|
| 1220601 | 3/1986 | U.S.S.R. |
| 1496744 | 7/1989 | U.S.S.R. |
| 1692488 | 11/1991 | U.S.S.R. |

*Primary Examiner*—Leo B. Tentoni
*Attorney, Agent, or Firm*—Marshall, O'Toole, Gerstein, Murray & Borun

[57] ABSTRACT

The invention provides methods for producing tubular sausage casings wherein regeneration of the interior portion of the viscose casing is initiated prior to regeneration of the exterior portion of the casing.

11 Claims, 1 Drawing Sheet

METHOD OF REGENERATING SAUSAGE CASING

BACKGROUND OF THE INVENTION

This invention relates to provision of a new method for differential regeneration of tubular non-fibrous, non-reinforced, regenerated cellulosic casing, normally referred to as skinless sausage casing.

Tubular cellulosic casing is well-known and has been widely used for many years by numerous manufacturers. The basic process for manufacturing regenerated cellulosic casings is through the well-known viscose process, which creates a liquified colloidal dispersion of cellulose fibers in an alkaline liquid carrier. Viscose is described in English Patent 8700, Cross, Bevan and Beadle, Lillienfield, U.S. Pat. No. 1,036,282 refines the compositions and Cohoe and Fox, U.S. Pat. No. 1,070,766; U.S. Pat. No. 1,158,400; U.S. Pat. No. 1,163,740 describe use of viscose to manufacture a tubular cellulosic casing. Henderson U.S. Pat. No. 1,601,686; U.S. Pat. No. 1,612,508; U.S. Pat. No. 1,645,050; and U.S. Pat. No. 1,654,253 provide basic technology to manufacture viscose into tubular casings, with regenerating baths contacting the inner and outer surfaces of the tube.

Methods for the regeneration of viscose into regenerated cellulose for manufacture of sausage casings are disclosed in Shiner, U.S. Pat. Nos. 2,999,756 and 2,999,757; Burke, U.S. Pat. No. 3,835,113; Bridgeford, U.S. Pat. No. 4,590,107; Jon, U.S. Pat. No. 4,778,639; and Markulin, U.S. Pat. No. 5,358,765. According to these methods, viscose (sodium cellulose xanthate, sodium hydroxide, water) is extruded through an annular die, into a coagulating and regenerating bath, to produce a regenerated cellulosic tubular casing. Upon contacting the regeneration bath, the viscose first coagulates (i.e., salt and water are removed causing the polymer chains to consolidate) followed by the step of regeneration where the xanthate molecule is decomposed to cellulose by reaction with sulfuric acid.

A critical aspect in the manufacture of the cellulosic casing is the rapidity of conversion of the liquified viscose into regenerated cellulose. A very detailed chemical discussion is included in: Physics and Chemistry of Cellulose Fibres, by Hendrik Petrus Hermans, Elsevier Publishing Company, 1949. Hermans provides a detailed description of means to increase strength of the regenerated cellulosic products, including increasing the final degree of polymerization of the product and raising the cellulosic composition of the viscose. Both options, however, will increase the viscosity of the viscose, making it more difficult to handle. Hermans also describes a regenerating bath of 9% $H_2SO_4$ (sulfuric acid), 22% $Na_2SO_4$ (sodium sulfate salt)), into which the viscose is cast to regenerate it back into cellulose. The selection of an appropriate salt concentration is critical, since the salt allows the viscose to gelatinize before the NaOH (sodium hydroxide) in the viscose can react with the sulfuric acid to regenerate the xanthate molecule into cellulose and water. The sodium sulfate also retards the sulfuric acid H ion penetration into the viscose, slowing down acid reaction.

The use of reacting baths containing $H_2SO_4$ and $Na_2SO_4$ was proposed by Muiller in U.S. Pat. No. 836,452, and such baths are referred to as Muiller baths. The concept of inner and outer baths contacting the interior layer of the annular viscose casing and the exterior layer of the casing is shown in Henderson, U.S. Pat. Nos. 1,601,686; 1,654,253 and 1,645,050.

According to conventional methods, regeneration fluids for treatment of cellulosic sausage casings typically have $H_2SO_4$ concentrations ranging from 110 to 130 g/l; $Na_2SO_4$ ranging from 200 to 280 g/l, and a bath temperature of from 40° C. to 50° C. The rate of regeneration of xanthate into cellulose may be substantially controlled by varying the following factors (for a constant viscose composition): (1) the concentration of $H_2SO_4$ in the regeneration bath; (2) the concentration of $Na_2SO_4$ in the regeneration bath; and (3) the temperature of the regeneration bath. A related factor is the rate of flow of regeneration fluid which replenishes and maintains the concentration of depleted regeneration fluid and thus affects the mixing and local concentration of $H_2SO_4$ and $Na_2SO_4$ at the interface between the regeneration fluid and the viscose.

Tubular cellulosic sausage casings are produced by regenerating viscose extruded through an annular extrusion die to produce an annulus of viscose having three portions. The annular viscose casing comprises an interior portion which contacts the regeneration fluid inside the tube; an exterior portion which contacts the regeneration fluid outside the tube; and a core portion sandwiched between interior and exterior portions. Typically, the core portion (or layer) is very large, representing 60% to 70% of the casing wall of the final dry casing. The exterior portion (or layer) typically comprises 20% to 40% of the wall, and the interior portion (or layer) is typically thinner than the exterior layer comprising 15% to 30% of the wall.

The exterior portion of the regenerated viscose casing is generally very dense and is frequently heterogeneous comprising several sublayers as a result of exposure to the very strong chemical reactions occurring during the extrusion process. In contrast, the interior portion of the casing is dense but is generally homogeneous since it is typically contacted with regeneration fluid only within the extrusion aquaria and at the die exit. After leaving the aquarium the interior layer is not directly contacted with regeneration fluid and is sheltered by the casing wall from direct contact with the exterior regeneration fluid.

Gases quickly evolve and escape from the interior and exterior casing layers during contact with the regeneration fluids and their solidification is relatively rapid. Regeneration of viscose within the core portion of the casing is relatively slow, however, because the core viscose is shielded from direct contact with the regeneration fluids by the interior and exterior layers which reduce the rate of diffusion of regeneration fluid into the core. In addition, the interior and exterior layers of the tubing impede diffusion of $H_2S$ and $CS_2$ gases generated during viscose regeneration out of the core portion. As a result, bubbles of trapped gas tend to become trapped in the casing core. Moreover, those $H_2S$ and $CS_2$ gases generated during viscose regeneration which migrate inward through the interior layer of the casing become trapped inside the casing tubing. In order to prevent bursting of the tubing by the accumulated gases and loss of width control, the tubings are periodically punctured to release the regeneration gases.

Conventional methods seek to produce casing products characterized by essentially equal levels of regeneration on the interior and exterior surfaces. The inner and outer skins are relatively dense, and are rapidly formed upon contact with regenerating bath. Nevertheless, as the skins densify, they inhibit the acid reaching the core layer. Consequently, the core layer regenerates later and is characterized by a lower density than the skin layer due to voids caused by trapped gases within the core layer. Later regeneration of the core layer also results in release of trapped gases further downstream in the process. Casings undergoing later regeneration can also require more frequently than desired puncturing in order to release the gases which are often trapped in the downstream water tub regions.

Methods for addressing the evolution of gases were disclosed by Voss, U.S. Pat. No. 1,887,446, which proposed that 50% of the casing travel path of the regenerating casing pass within the regeneration liquid and 50% of the travel path pass outside of the regeneration liquid to provide space for accumulation of the evolved gases. The absence of hydraulic pressure on the casing outside of the regeneration liquid allows accumulation of considerable quantities of gases before their removal becomes necessary thus increasing the time between puncturing of the casing to release the gases.

Hewitt, U.S. Pat. No. 1,937,225 discloses viscose regeneration methods which reduce the frequency of puncturing of tubular casings by slowing the rate of regeneration and consequent gas generation. Specifically, Hewitt slows the rate of regeneration by lowering $H_2SO_4$ concentration in the regenerating bath and also increases cab heights to better distribute the gas for puncturing. This assists in distributing the gas throughout the process and provides greater volume for a fixed quantity of gas resulting in longer times (and increased distances) between casing punctures.

In contrast, Freund, U.S. Pat. No. 2,013,491 purposely accelerates regeneration, which takes place in a long vertical tank, to allow easy escape of the internal gas through the drain in the extrusion nozzle attached to the vertical aquaria tank.

Hewitt, U.S. Pat. No. 2,043,172 discloses an extrusion die wherein the inner and outer baths meet the casing at the same contact point on inner and outer surfaces. Hewitt specifies preferentially using a coagulating and regenerating solution bath drawn from the same source for treatment of the interior and exterior of the casing.

Voss et al., U.S. Pat. No. 2,043,455 disclose an extrusion die wherein the inner and outer baths meet the casing at the same contact point on the inner and outer surfaces. The patent states that the coagulation and regeneration fluid supplied to the inner and outer surfaces are preferably identical but not necessarily so. The patent further discloses means for discharging coagulation and regeneration fluid to the interior and exterior surfaces of the casing above the bath surface.

Russia Patents SU 1,496,744 and SU 1,692,488 disclose extrusion dies wherein the regeneration fluids are contacted at the same point on the inner and outer layers. Russia Patent SU 1,220,601 discloses an extrusion die for production of a viscose casing but the drawing does not clearly disclose the location where the regeneration fluid meets the inner and outer layers of the viscose tubing. The text of the reference does not disclose contacting different regeneration fluids on the inner or outer layers or contacting those layers at different times.

Atkinson, U.S. Pat. No. 2,271,932 discloses a die member enclosing a generally cylindrical chamber, the lower portion of which is tapered downwardly enclosing an inner mandrel which is correspondingly tapered and vertically adjustable to regulate the annular passage between the mandrel and die, to thereby regulate the wall thickness of the tube as extruded. While, such a vertical adjustment to increase or decrease the width of the annular passage may cause the interior and exterior portions of the viscose to be contacted at slightly different times, there is no teaching in the reference that the interior portion of the casing be contacted with regeneration fluid prior to contacting the exterior portion of the casing or in a manner which would initiate regeneration of the interior portion of the casing prior to regeneration of the exterior portion of the casing. Moreover, the art generally avoided adjustment of a tapered mandrel to vary the opening size between the mandrel and die because restriction of the opening size would tend to cause accumulation of sulfur compounds. Accordingly, the practice in the art was to vary flow of the viscose through use of metered pumps.

Atkinson further discloses using a longer residence time from the aquarium exit to the first tub after the aquaria. This residence time allows more gas and liquid to run back through the nozzle attached to the aquaria and allows the casing to cool. Atkinson indicates the desirability of imparting some machine direction stretch after complete regeneration to strengthen the casing with preferred longitudinal stretch reported to be 5% to 70%.

Shiner et al., U.S. Pat. Nos. 2,999,756 and 2,999,757 describe transverse orientation after full regeneration to strengthen and orient the casing with minor machine direction orientations.

Bridgeford, U.S. Pat. No. 4,590,107 relates to methods for reducing the level of gases trapped within the casing and for increasing the thickness of the inner and outer layer and increasing overall film density by decreasing the quantity of low density spongy core layer. Bridgeford disclosed slow regeneration methods wherein regeneration was carried out on the inside and outside layers at equal rates. Bridgeford taught a degree of casing polymerization of 450 to 750, with regeneration bath (Muller bath) temperatures of 28° C. to 34° C. compared to 40° C. to 46° C. of the prior art. Bridgeford also taught use of a regeneration fluid having a sulfuric acid concentration of 100 to 120 g/liter compared to prior art sulfuric acid concentrations of 50 g/liter to 135 g/liter, and an increased sodium sulfate concentration of 250 g/liter to 280 g/liter and sodium sulfate concentrations of 150 to 250 g/liter. Each of these three changes (decreased temperature, and increased sulfuric acid and sodium sulfate concentrations) made by Bridgeford dramatically slow the rate of regeneration resulting in a stronger casing. The strength resulted from increasing casing density to 1.46 to 1.53 g/cc range, compared to the prior art range of 1.37 g/cc to 1.40 g/cc. Bridgeford thus taught the desirability of increasing density overall by increasing the density of the core layer while increasing the thickness (but not the densities) of the inner and outer layers.

Nevertheless, there remains a desire in the art for methods which provide regenerated viscose casing having improved physical properties including increased interior density. It is further desired that the casing be characterized by a tougher, thicker and smoother skin in order to enhance casing peelability and reduce abrasive damage during shirring and stuffing.

SUMMARY OF THE INVENTION

The present invention provides an improved method for producing tubular sausage casings of regenerated cellulose such that the casings are regenerated with a higher level of regeneration on their interior than on their exterior. Specifically, the invention provides improvements in methods for producing tubular sausage casings of regenerated cellulose comprising the steps of extruding viscose through an annular extrusion die to form an annular viscose casing having an interior portion, an exterior portion, and a core portion disposed between said interior portion and said exterior portion, contacting the interior portion of the casing with a first regenerating fluid, and contacting the exterior portion of the casing with a second regenerating fluid and regenerating the tubular casing, the improvement comprising: contacting the interior portion of the casing with the first regenerating fluid and the exterior portion of the casing with the second regenerating fluid in a manner such that regeneration of the viscose making up the interior portion of the casing is initiated prior to regeneration of the viscose making up the exterior portion of the casing. The methods of the invention help provide a tougher, thicker and smoother skin characterized by improved peelability and increased abrasion resistance during shirring and stuffing. Such properties will help reduce pinholing damage from shirring roll contact and reduce breakage during stuffing.

Various methods are provided for carrying out the invention including contacting the interior portion of the casing with regeneration fluid prior to contacting the exterior portion; contacting the interior portion of the casing with regeneration fluid having a higher sulfuric acid content than the exterior portion; contacting the interior portion of the casing with regeneration fluid having a lower sodium sulfate concentration than the exterior portion of the casing and contacting the interior portion of the casing with regeneration fluid having a higher temperature than the exterior portion of the casing. As will be apparent in light of the following discussion, these methods for initiating regeneration of the interior layer prior to regenerating the exterior layer may be used alone or in combination with each other.

According to the most preferred method, the interior portion of the casing is contacted with regeneration fluid prior to contact of the corresponding exterior portion of the casing with regenerating fluid. In this manner coagulation and regeneration of the interior portion of the casing is initiated prior to coagulation and regeneration of the corresponding exterior portion of the casing. While continued regeneration of the exterior of the casing (particularly after the casing exits the aquarium and the interior of the casing is no longer contacted with regeneration fluid) may eventually cause the exterior portion of the casing to become more completely regenerated than the corresponding interior portion the method whereby regeneration of the interior portion of the casing is initiated prior to initiation of regeneration of the exterior portion provides numerous advantages.

According to one aspect of the invention, extrusion of viscose is carried out by using a specially fashioned extrusion die comprising an inner lip and an outer lip forming an annulus through which viscose is extruded wherein the outer lip extends further in the direction of extrusion than does the inner lip. In this manner, the interior portion of the extruded viscose tubing is contacted with regeneration fluid prior to the exterior portion of the casing at the same cross-section. While the degree of extension preferred is dependent upon the concentrations of acid present in the regeneration fluids and the temperatures of those fluids it is generally contemplated that the outer lip extend roughly 5 to 20 mm beyond the inner lip with an extension of 5 to 10 mm generally being preferred. While it is possible to extend the outer lip more than 20 mm beyond the inner lip, such an extension is less preferred because of the tendency of the casing to distort.

Dies useful according to the invention for contacting the inner portions and outer portions of viscose at different times may be specially designed and fabricated. Alternatively, conventional dies may be retrofitted by use of die lip extensions comprising a metal annulus having an inner diameter corresponding to the outer lip of an existing extrusion die such that the die lip extension shields the outer surface of viscose extruded by the die from contact with regeneration fluid while the inner surface of viscose is contacted by regeneration fluid. Suitable die lip extensions may be of any outer diameter and the thickness of the annulus preferably ranges from 5 mm to 20 mm with 5 mm to 10 mm being preferred.

According to another aspect of the invention which may be used independently or in conjunction with the extrusion dies described above, the first regenerating fluid which contacts the interior portion of the casing has a greater $H_2SO_4$ concentration than the second regeneration fluid contacting the exterior portion of the casing. Thus, according to a preferred method, the sulfuric acid concentration at the exit of the interior regeneration bath after it has contacted the casing should be at least 5 g/l and preferably greater than 10 g/L greater than the sulfuric acid concentration at the exit of the exterior regeneration bath after it has contacted the casing. In this manner, regeneration of the interior portion of the casing progresses at a faster rate than regeneration of the exterior portion of the casing. Because the interior regeneration bath is present in a smaller volume than the exterior bath $H_2SO_4$ is more rapidly depleted in the interior bath. Accordingly, in order to maintain a desired sulfuric acid concentration greater than 85 g/l at the exit of the interior bath the interior regeneration bath is preferably fed with regeneration fluid having a sulfuric acid concentration of 125 to 135 g/l. In contrast, because the volume of the exterior bath is greater regeneration fluid supplied to the exterior bath at a sulfuric acid concentration of 90 g/l will generally maintain a concentration of 85 g/l or greater within the bath. If the $H_2SO_4$ concentration of either regeneration bath drops below about 85 g/l the rate of regeneration generally becomes undesirably slow, in part because the rate of diffusion of regeneration fluid into the core portion drops significantly. This is particularly the case at the top of the aquarium where the casing is semi-solid and the regeneration fluid is at its weakest. In addition, low regeneration fluid concentrations will tend to produce excess regeneration gas.

According to a further aspect of the invention the first regeneration fluid which contacts the interior portion of the casing has a lower $Na_2SO_4$ concentration than does the second regeneration fluid. In this manner, regeneration of the interior portion of the casing progresses at a faster rate than regeneration of the exterior portion of the casing. Preferred $Na_2SO_4$ concentrations at the inlet of the exterior regeneration fluid are approximately 250 g/l with preferred $Na_2SO_4$ concentrations at the inlet of the interior regeneration fluid ranging from 150 to 200 g/l. Thus, according to a preferred method, the sodium sulfate concentration at the exit of the exterior regeneration bath after it has contacted the casing is at least 5 g/l greater and preferably 10 g/L greater than that at the exit of the interior regeneration bath after it has contacted the casing.

According to still another aspect of the invention the first (interior) regeneration fluid has a higher temperature than the second (exterior) regeneration fluid. According to this embodiment of the invention, it is preferred that the interior regeneration fluid temperature be maintained from 5° to 10° C. warmer than that of the exterior regeneration fluid. This will also promote regeneration of the interior portion of the casing at a faster rate than regeneration of the exterior portion of the casing thus providing casings having the improved properties of the invention.

A change of 10° C. in regeneration bath temperature has a three-fold effect on the rate of regeneration but only a one-fold effect on the diffusion rate of salt through the casing because acid moves quickly through the walls of the casing during regeneration but salt moves more slowly during coagulation. Thus, it is desired to regenerate the interior surface of the casing more rapidly than the exterior surface to prevent gases from passing later into the inner space of the tubing. At the same time it is desired not to regenerate the interior layer so quickly as to produce a mushy layer. Thus, the temperature of the baths must be controlled in conjunction with the concentrations of the interior and exterior regeneration fluids in order that the interior layer is regenerating while the exterior layer is coagulating while both are regenerating/coagulating slower than conventional regeneration such as that of Bridgeford. In this manner, it can be assured that salt and gas pass to the outside wall resulting in an interior surface which is hard and tough, without damage caused by excessive gas pockets.

DETAILED DESCRIPTION OF THE INVENTION

Figure 1:
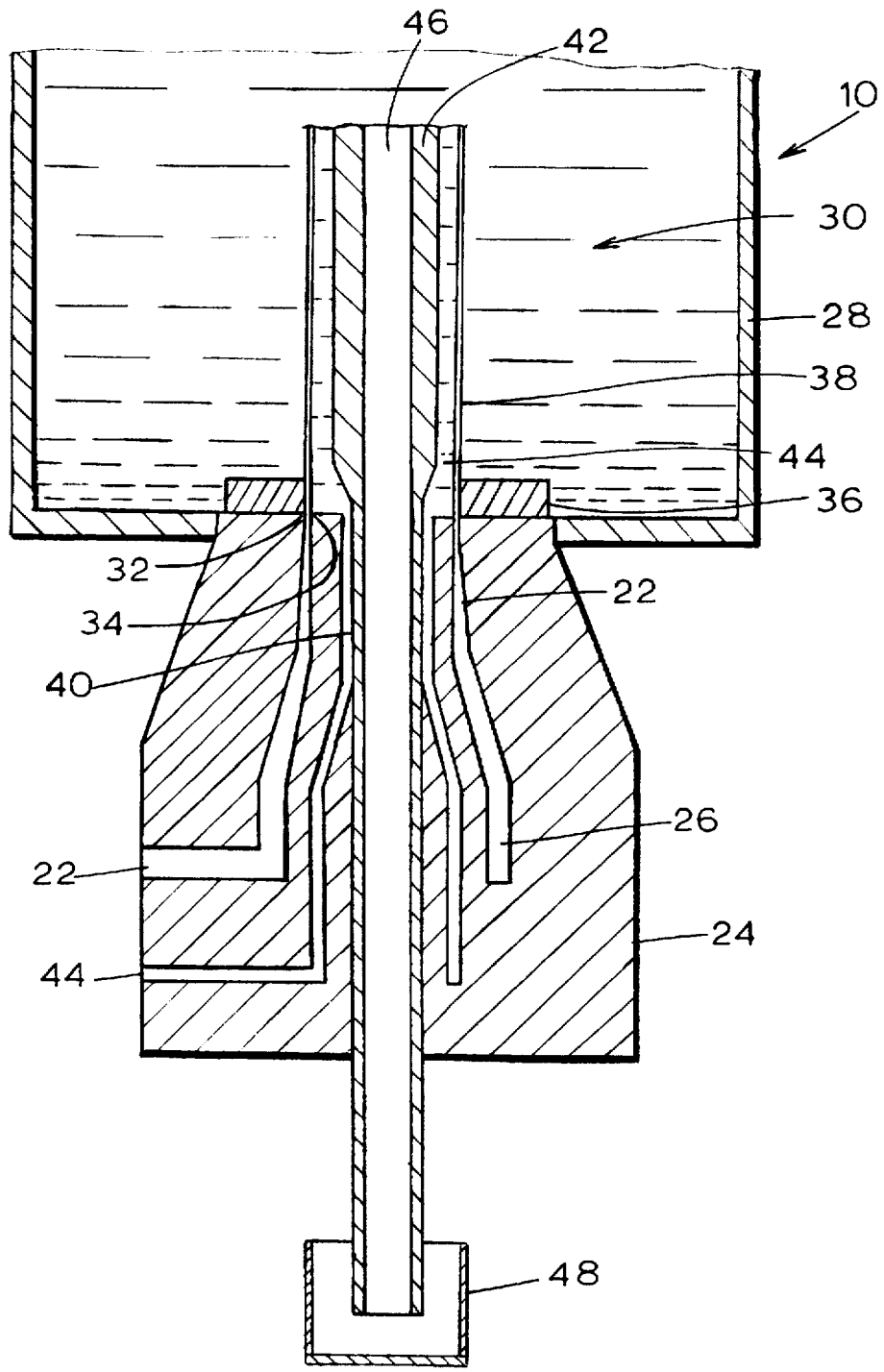
FIG. 1 is a cross-sectional view of the tubular cellulosic casing die useful according to the methods of the invention.

The object of the invention is to provide a method to differentially regenerate viscose casings wherein regeneration of the interior annular portion of the casing is initiated prior to that of the corresponding exterior annular portion of the casing. In this manner casings can be produced which have an interior portion characterized by a density greater than that of the exterior annular portion of the casing. Preferably it is desired to have an interior casing layer which solidifies slowly relative to conventional methods but faster than the exterior layer. Thus, with the inner layer being more dense throughout gas regeneration, the core layer gases would tend to exit via diffusion to the outside of the casing. This would have the favorable result of reducing accumulation of gases inside the casing tubing and increase the time between puncture intervals.

While the prior art teaches simultaneously contacting the inner and outer layers of the extruded viscose tubing with regenerating bath one aspect of the present invention provides contacting regeneration fluid with the interior of the casing wall prior to contacting the exterior of the casing wall such that the interior casing wall commences regeneration slightly in advance of the exterior casing wall. In this manner, the interior layer will substantially complete coagulation (consolidation of the polymer molecules) and start regeneration (decomposition of the xanthate molecule) during coagulation of the exterior surface resulting in an interior layer having lower porosity than the exterior wall because the regeneration gases will have a greater tendency to exit through the exterior wall than through the interior wall.

According to one method of the invention, an extension may be added to the lip of the extrusion die (die lip extension) such that the exterior wall of the viscose will be temporarily shielded from the exterior regeneration bath will allowing the interior regeneration bath to contact the viscose and commence regeneration. Thus, when the interior layer is first contacted with regeneration fluid, it has the chance to begin coagulation before the exterior layer. According to one preferred embodiment of the invention, the density and final thickness of the interior portion of the casing is approximately 15% to 25% of the total casing wall structure. Moreover, the interior layer may no longer be homogeneous but may itself comprise two layers, with the skin on the interior surface serving to retard gas transmission. The present methods may also enhance the smoothness of the interior surface of the final casing product to improve peelability of the casing.

While it is generally preferred according to the invention that the interior regeneration fluid have a higher temperature than the exterior regeneration fluid, an alternative aspect of the invention provides that the interior regeneration bath may have a temperature cooler than that of the exterior regeneration bath if sufficient other steps are carried out to assure that regeneration of the interior layer of the casing is initiated prior to initiation of regeneration of the exterior portion of the casing. Thus, by cooling the interior regeneration bath to a temperature preferably 5° C. cooler than the exterior regeneration bath, regeneration of the viscose proceeds more slowly, maximizing the thickness of the interior layer and diminishing the core layer thickness for any given casing wall thickness. Nevertheless, when the interior regeneration bath is cooler than the exterior regeneration bath it will generally necessary to increase the sulfuric acid concentration in the interior bath in order to make up for the slower regeneration kinetics resulting from the decreased temperature. This will generally be the case even though use of the die lip extension will initiate regeneration on the interior layer before initiation of regeneration on the exterior layer.

To enhance regeneration of the interior layer after the initial skin formation, the interior regeneration bath composition can also be altered to decrease the rate of regeneration. For example, according to one method of the invention, with a 50 m/min. viscose extrusion speed and an exterior bath depth of about 305 cm. if the outer bath comprises $H_2SO_4$ at 120 g/l, and $Na_2SO_4$ at 250 g/l at 40° C., the interior bath composition can be selected to have a concentration of $H_2SO_4$ at 110 g/l and $Na_2SO_4$ at 280 g/l at 35° C. Regeneration of the interior layer regeneration will proceed slower than that of the exterior layer by virtue of the fact that $H_2SO_4$ in the interior regeneration fluid is more rapidly depleted during regeneration. Thus the interior bath composition exiting the aquaria drops to about 85 g/l $H_2SO_4$ versus the exterior bath concentration dropping to about 105 g/l $H_2SO_4$. Accordingly, regeneration of the exterior portion of the casing proceeds rapidly creating a premature exterior skin which would ordinarily cause gas to flow inward on regeneration. According to the invention, however, the initial regeneration of the interior portion of the casing produces an initial skin which is sufficient to act as a barrier to diffusion. As a result, gas bubbles are drawn outward thus allowing the interior bath regeneration to continue slowly to maximize the thickness of the interior layer. Further, the method provides the advantage of reducing the generation of gas into the interior of the casing tubing thus reducing the requirement of puncturing the casing to release the gas.

The early initiation of coagulation and regeneration on the interior layer may result in a slight increase in shrinkage, which can impart some micellar orientation in the interior layer which does not exist in the other two layers. Hence, the interior layer must be allowed to grow and diminish the core layer so a new adhesive boundary is formed. As a result, the casing may be strengthened with higher premature orientation of the interior layer giving it additional strength in the wet gel state to resist abrasion and breakage throughout the extrusion process.

The methods of the invention provide casings characterized by improved properties whereby after formation of an initial skin on the interior layer of the casing regeneration is continued very slowly in order to maximize the interior layer wall thickness and hence the density. It is also desirable to slowly regenerate the exterior layer to also maximize its thickness and strength. The core layer is thus diminished to less than 40% of the final casing wall structure, with the casing exhibiting a density over 1.6 g/cc. The casing strength is increased, and abrasion resistance is enhanced greatly. Thinner casings can be made, and higher cellulose composition viscose (over 8% cellulose) can be regenerated, resulting in higher degree of polymerization of the casing.

Those skilled in the art can adjust various combinations of bath compositions, temperature, flow rates and die lip extensions to maximize the benefit provided by the methods of the present invention. As a further aspect of the invention it is also possible to contact the interior and exterior portions of the extruded casing simultaneously (i.e., using no die lip extension), and provide an interior bath with a higher than normal $H_2SO_4$ composition (about 130 g/l) and a lower than normal $Na_2SO_4$ composition (210 g/l or less) at slightly higher than normal bath temperature, (about 42° C., for example) to flash form the skin layer of the inner layer. According to such methods, $H_2SO_4$ concentrations may vary from 90 to 130 g/l; $Na_2SO_4$ concentrations vary from 210 to 260 g/l and temperatures range from about 36° C. to about 45° C. Given the higher reactivity of the bath, the flow of interior liquid into the casing interior must be reduced to compensate and to thus retard regeneration rate quickly, allowing the total interior layer thickness to increase. For example, on a U.S. caliber 25 casing (2.04 g/m bone dry gauge, 33 mm dry flat width) the flow rate for the interior bath would be reduced from a conventional rate of 800 ml/min to about 600 ml/min which will result in a retarded interior layer regeneration rate after skin formation.

The methods of the present invention may be practiced with a wide variety of extrusion dies known to the art. One such apparatus is that disclosed by co-owned and copending application U.S. Ser. No. 08/674,150 filed Jul. 1, 1996 now allowed and issue fee paid for Tubular Cellulosic Casing Die, the disclosure of which is hereby incorporated by reference. This application discloses a casing die having an adjustable lip opening which could be used according to the methods of the invention, either by addition of a die lip extension or by other wise practicing the methods of the invention such as by varying regeneration fluid concentrations and/or temperatures.

Another embodiment of the invention is illustrated by FIG. 1 which depicts a tubular cellulosic casing extruder 10 which as described in detail below, receives viscose in a highly viscous liquid form, extrudes it into a tubular shape, and regenerated the viscose into a cellulosic tubular casing. The extruder 10 includes a viscose feed tube 22 that receives viscose from a viscose supply tank (not illustrated) and feeds the viscose to a die body 24 having an interior bore 26. The die body 24 is joined at its top to a lower portion of an aquarium 28. The aquarium 28 contains an exterior bath of regenerating fluid 30. The die body 24 comprises an outer lip 32 at its top and an inner lip 34. Disposed above the outer lip 32 is a die lip extension 36 which extends the outer lip beyond the inner lip in the direction of viscose flow. Together, the outer lip 32, the inner lip 34 and the die lip extension 36 define an annular space through which viscose is extruded to form tubular cellulosic casing 38.

The inner lip 34 also defines an interior longitudinal bore 40 through which interior regenerating fluid flows as described in detail below. Extending upward through the inner bore 40 is a mandrel 42 that is fed down thorough the aquarium 28 and mates with the die body 24. The mandrel 42 is disposed inside of the cellulosic casing 38 and defines an interior annular space 44 therewith for containing an interior regeneration bath of regenerating fluid that is received from the interior bore 40. The interior regenerating fluid contacts the tubular cellulosic casing 38 and then flows through a mandrel bore 46 of the mandrel 42 and down into drain trap 48. Any regeneration gases that pass into the interior annular space 44 can also flow through the mandrel bore 46 of the mandrel 42 and into drain trap 48.

The arrangement of the outer lip 32, the inner lip 34 and the die lip extension 36 is such that the interior portion of the extruded cellulosic casing 38 is contacted with regeneration fluid prior to contact of the exterior portion of the casing which does not occur until that portion of the viscose contacts the exterior bath of regeneration fluid 30 beyond the die lip extension 36. As a result, coagulation and regeneration of the exterior portion of the casing will not commence until after initial regeneration and formation of a "skin" on the interior surface of the casing 38. Consequently, regeneration gases will have a greater tendency to diffuse out of the exterior of the casing 38 into the exterior bath than into the interior bath.

Numerous modifications and variations in the practice of the invention are expected to occur to those skilled in the art upon consideration of the presently preferred embodiments thereof. With differential regeneration of the casing, the individual layers can be customized to maximize strength, shrinkage or wall thickness. Consequently, the only limitations which should be placed upon the scope of the invention are those which appear in the appended claims.

What is claimed is:

1. In a method of producing tubular sausage casings of regenerated cellulose comprising extruding viscose through an annular extrusion die to form a casing of viscose having an interior portion, an exterior portion, and a core portion disposed between said interior portion and said exterior portion, contacting the interior portion of the casing with a first regenerating fluid, and contacting the exterior portion of the casing to form a tubular casing of regenerated cellulose with a second regenerating fluid and regenerating the tubular casing the improvement comprising:

contacting the interior portion of the casing with the first regenerating fluid and the exterior portion of the casing with the second regenerating fluid in a manner such that regenerating of the interior portion of the casing is initiated prior to regenerating of the exterior portion of the casing.

2. The method of claim 1 wherein at a given cross-section of the regenerating casing the interior portion of the casing is contacted with regenerating fluid prior to contact of the exterior portion of the casing with regenerating fluid.

3. The method of claim 2 wherein the annular extrusion die comprises an inner lip and an outer lip forming an annulus through which viscose is extruded wherein the outer lip extends further in the direction of extrusion than does the inner lip.

4. The method of claim 3 wherein the outer lip extends from 5 mm to 20 mm farther in the direction of extrusion than does the inner lip.

5. The method of claim 4 wherein the outer lip extends from 5 mm to 10 mm farther in the direction of extrusion than does the inner lip.

6. The method of claim 1 wherein the first regenerating fluid has a greater $H_2SO_4$ concentration than the second regenerating fluid.

7. The method of claim 6 wherein the $H_2SO_4$ concentration of the first regenerating fluid is 5 g/l greater than that of the second regenerating fluid after they have contacted the casing.

8. The method of claim 1 wherein the first regenerating fluid has a lower $Na_2SO_4$ concentration than does the second regenerating fluid.

9. The method of claim 8 wherein the $Na_2SO_4$ concentration of the first regenerating fluid is 5 g/l less than that of the second regenerating fluid after they have contacted the casing.

10. The method of claim 1 wherein the first regenerating fluid has a higher temperature than the second regenerating fluid.

11. The method of claim 10 wherein the temperature of the first regenerating fluid is greater than 5° C. warmer than that of the second regenerating fluid.

* * * * *

UNITED STATES PATENT AND TRADEMARK OFFICE
CERTIFICATE OF CORRECTION

PATENT NO. : 5,776,398
DATED : July 7, 1998
INVENTOR(S) : Alan David Stall and Antonio Vitorero Miguelez It is certified that error appears in the above-identified patent and that said Letters Patent is hereby corrected as shown below:

Col. 1, line 60: After "...was proposed by", delete "Muiller" and insert -- Müller --.

Col. 1, line 61: After "...referred to as", delete "Muiller" and insert -- Müller --.

Col. 10, line 30: After "...such that", delete "regenerating" and insert -- regeneration --.

Col. 10, line 31: After "...prior to", delete "regenerating" and insert -- regeneration --.

Signed and Sealed this

Thirtieth Day of May, 2000

Attest:

Q. TODD DICKINSON

*Attesting Officer*     *Director of Patents and Trademarks*